Dec. 3, 1940.                R. E. PONDER                2,223,639
                              CONVEYER
                        Filed June 13, 1938           2 Sheets-Sheet 1
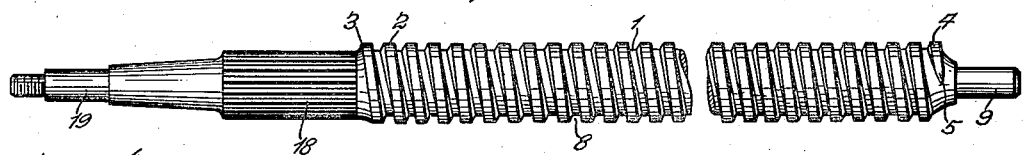
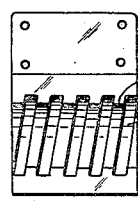
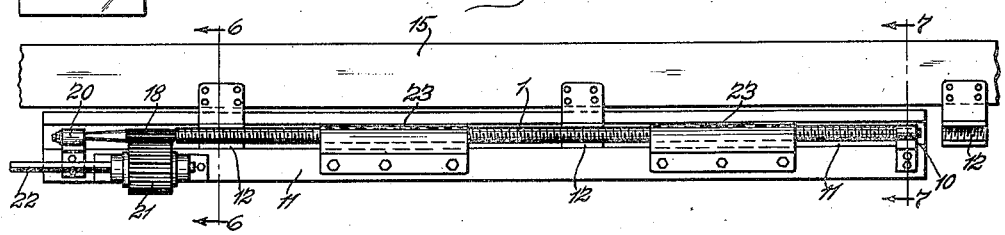
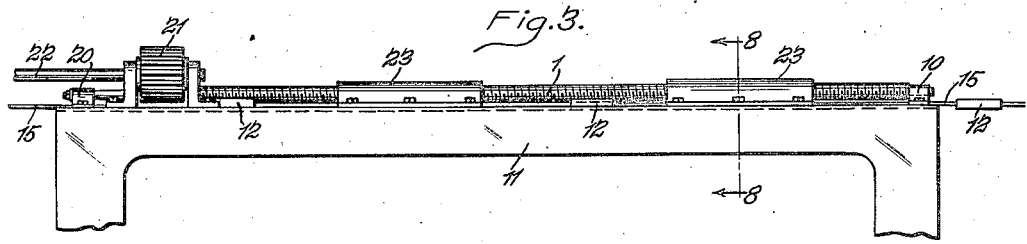
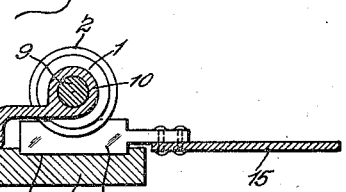
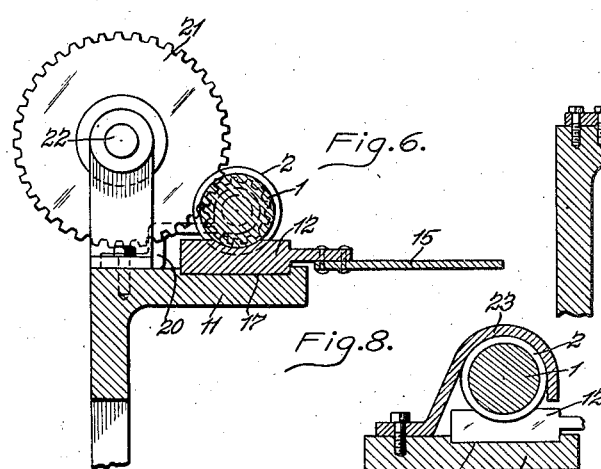
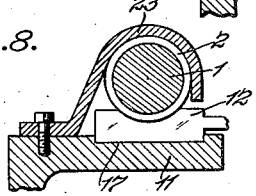
Inventor
Ray E. Ponder
By Rippey & Cassidy
His Attorneys.

Dec. 3, 1940.                R. E. PONDER                2,223,639
                              CONVEYER
                         Filed June 13, 1938           2 Sheets-Sheet 2
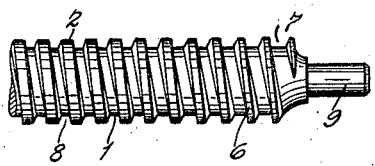
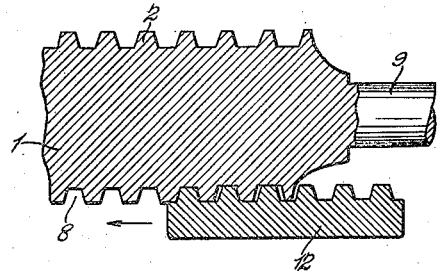
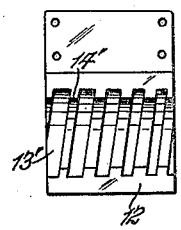
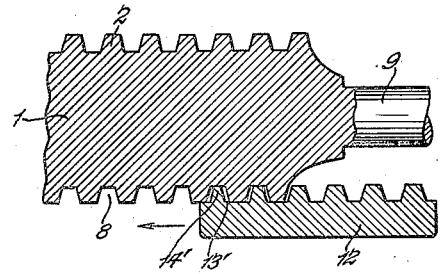
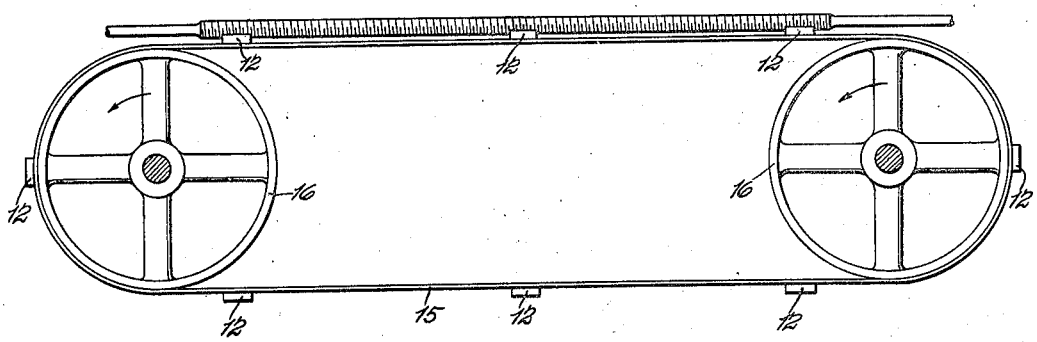

Patented Dec. 3, 1940

2,223,639

UNITED STATES PATENT OFFICE 2,223,639

CONVEYER

Ray E. Ponder, St. Louis, Mo., assignor to United Wood Heel Company, St. Louis, Mo., a corporation of Delaware Application June 13, 1938, Serial No. 213,348

9 Claims. (Cl. 198—203)

This invention relates to conveyers adapted for use for many purposes.

Objects of the invention are to provide an improved conveyer applicable to many uses and comprising a rod or shaft formed with a spiral thread along a portion of its length and adapted to engage articles, or supports for articles, to be moved along said rod or shaft; to provide means for supporting said rod or shaft in a manner to permit the articles or supports for articles to be successively engaged with the shaft near one end thereof and continuously moved thereby in a desired spaced relationship; to provide means for rotating said rod or shaft to effect movement of the articles or supports for articles as aforesaid, and for moving said articles or supports successively out of engagement with the rod or shaft near the end opposite from the end first engaged thereby; to provide a conveyer adapted to engage successively articles or supports therefor attached to an endless flexible member so that, during operation of the conveyer, substantial oscillation and vibration of the articles or supports therefor that are in engagement with the rod or shaft are avoided and prevented; and to provide an improved conveyer embodying the advantageous construction and other features hereinafter disclosed.

Other objects of the invention will be apparent from the following description, reference being made to the annexed drawings, in which—

Fig. 1 is a broken view of the conveyer rod or shaft constituting an essential feature of the present invention.

Fig. 2 is a plan view of the conveyer in an environment for advancing, continuously and in spaced relationship, a number of articles or supports therefor and preventing substantial oscillation or vibration thereof.

Fig. 3 is a side elevation of the conveyer shown in Fig. 2.

Fig. 4 is an enlarged plan view of an article or support adapted to be moved successively into and out of engagement with the conveyer rod or shaft.

Fig. 5 is an end elevation of the article or support shown in Fig. 4.

Fig. 6 is an enlarged sectional view on the line 6—6 of Fig. 2.

Fig. 7 is an enlarged sectional view on the line 7—7 of Fig. 2.

Fig. 8 is an enlarged sectional view on the line 8—8 of Fig. 3.

Fig. 9 is a plan view showing a modification of one end of the conveyer rod or shaft having the thread thereon of diminishing width toward the end thereof with which the article or support is first engaged.

Fig. 10 is an enlarged sectional view of the construction shown in Fig. 9, and also showing the article or support in engagement with the tapered threads.

Fig. 11 is a view similar to Fig. 10, showing an alternative construction in which the threads on the rod or shaft are of uniform thickness almost to the end thereof and the threads on the article or support are spaced varying distances and are of different thicknesses in order to effect proper engagement with the rod or shaft during continuous rotation of the latter and during continuous movement of the article or support.

Fig. 12 is a plan view of the article or support shown in Fig. 11.

Fig. 13 is a diagrammatic view illustrating an endless flexible member, such as a belt or chain, to which the articles or supports are attached in spaced relationship so that they may be moved successively into engagement with the conveyer rod or shaft of Fig. 2.

The conveyer rod or shaft constituting an essential element of the present invention is of a form and construction specially adapting it for use as the conveyer device. Said rod or shaft comprises the cylindrical body 1 which is of larger diameter than other portions thereof and which has thereon a spiral formation or thread 2 resembling square or Acme thread. This formation or thread 2 may be symmetrical as to dimensions, etc. from the discharge end 3 to a point near the receiving end 4. Near the receiving end 4 the formation or thread 2 may be tapered or of diminishing thickness for a short distance, as indicated at 5 (Fig. 1); or may be formed with a portion 6 (Fig. 9) of greater length than the portion 5, which is also of diminishing thickness, leaving the space 7 between adjacent portions of the thread of greater width than the space 8 elsewhere along the rod or shaft.

The conveyer rod or shaft is formed at one end with a trunnion 9 of less diameter than the diameter of the body 1 adapted to be journalled in a supporting bearing 10. The bearing 10 is spaced above the support 11 along which the article or article support 12 is moved by the conveyer rod or shaft. In the form shown in Figs. 4 and 5, the article or article support 12 is a segment of a nut having therein inclined grooves 13 defining inclined flanges or threads 14 adapted to engage in the spaces between the spirals of the thread 2 on the conveyer rod or shaft. In the embodiment shown, there are a number of these members 12 attached in spaced relationship to an endless flexible belt or chain or the like 15, which may be mounted for operation about the supporting wheels or pulleys 16, diagrammatically illustrated in Fig. 13 of the drawings. In this construction the members 12 move along a groove 17 in the support 11 below the rod or shaft 1. The bearing 10 is separated from the support 11 by a space wide enough to permit the members 12 to pass freely below the bearing into engagement with the thread 2.

Beyond the discharge end 3 of the thread 2, the rod or shaft 1 is formed with an elongated pinion 18 and, beyond said pinion, is formed with a trunnion 19 adapted to be mounted in a journal bearing 20 similar to the journal bearing 10 and similarly arranged so as to permit the members 12 to move freely thereunder. An elongated gear 21 meshes with the pinion 18 in a manner to provide a space through which the members 12 may move without interference. The gear 21 is attached to a shaft 22 which may be rotated by an appropriate motor, not shown.

If desired, bearing or abutment elements 23 may be rigidly attached at spaced intervals to the support 11 to engage the upper and lateral sides of the conveyer rod or shaft to prevent vibration or oscillation thereof during operation of the conveyer.

Instead of forming the conveyer shaft with the elongated reduced portion 6 of the thread 2, the members 12 may be formed with grooves 13' of greater widths, thereby providing the flanges or threads 14' of lesser widths so as to engage freely with the receiving end of the thread on the conveyer shaft, as should be understood by reference to Fig. 11.

It should now be clear that this invention attains all of its intended objects and purposes with a high degree of efficiency. The rigid rotary conveyer rod or shaft, engaging successively the parts 12 which are attached to and supported by the endless member 15, maintains all of said parts 12 in continuous movement, properly spaced, and free from undesirable vibration and oscillation, due to the coöperation of the conveyer rod or shaft with the rigid support 11. This effect and result, which are essential in different machines in which the conveyer may be included, are impossible to attain without some rigid type of conveyer instead of the belts or chains frequently used.

The invention may be varied in numerous particulars without departure from the nature and principle thereof, and such variations are contemplated in order to adapt the invention for different uses in different environments.

I claim:

1. A device of the character described comprising a rigid support, an endless flexible element, a threaded member attached to said element and adapted to be moved along said support, rigid bearings separated from said support by a space through which said member is movable, a rotary shaft journalled in said bearings and having a spiral thread therealong between said bearings and provided with a tapered receiving end adapted to engage said threaded member during rotation of said shaft and movement of said member and having a discharging said member from engagement with said thread, and means for holding said member from lateral oscillation during movement thereof along said support.

2. A device of the character described comprising a rigid horizontal support, a threaded member adapted to be moved onto and along said support, means rigid with said support for guiding and preventing oscillation of said member during movement of said member on and along said support, bearings separated from said guiding means by a space through which said member is movable on and along said support, an elongated horizontal rotary shaft journalled in said bearings and having a spiral thread therealong between said bearings and provided with a tapered receiving end adapted to engage said threaded member during rotation of said shaft and movement of said member and having a discharge end for discharging said member from engagement with said thread on said shaft, bearing elements engaging the upper and lateral sides of said thread between said first named bearings and preventing upward and lateral oscillation of said shaft, and mechanism for rotating said shaft.

3. A device of the character described comprising a rigid supporting and guiding device, an endless flexible element, a series of spaced threaded members attached to said element and adapted to be moved along said supporting and guiding device, rigid bearings separated from said supporting and guiding device by a space through which said members are movable, a rotary shaft journalled in said bearings and having a spiral thread therealong and provided with a tapered receiving end adapted to engage said threaded members during rotation of said shaft and movement of said members and having a discharge end for discharging said members from engagement with said thread on said shaft, means engaging said thread on said shaft between said bearings and holding said shaft from substantial vibration, and mechanism for rotating said shaft and thereby operating said members and said flexible element.

4. A device of the character described comprising a movable threaded member, rigid spaced bearings, an elongated horizontal rotary shaft journalled in said bearings and having a spiral thread therealong of approximately uniform diameter throughout and provided with a tapered receiving end adapted to engage the threads of said member during rotation of said shaft, a rigid combined support and guide for said member separated from said bearings and said shaft by a space and holding said member from vibration during movement thereof by said shaft on and along said support and guide and through said space, and means between said bearings engaging and preventing upward and lateral vibration of said shaft.

5. In a device of the character described, a rigid support, rigid bearings attached to and separated from said support by a space constituting an elongated passage, a rotary shaft journalled in said bearings and having a relatively long spiral thread thereon between said bearings, and rigid abutment elements attached to said support and engaging the upper and lateral sides of said shaft above said space and preventing upward and lateral vibration of said shaft during operation thereof.

6. In a device of the character described, a rigid support, means forming a guide along one side of said support, widely spaced bearings attached to said support laterally from said guide and separated from said guide by a space for members supported by and moving along said guide, and an elongated rotary shaft journalled in said bearings and having a long spiral thread thereon between said bearings for engaging and moving said members along said guide when said shaft is rotated.

7. In a device of the character described, a rigid support, means forming a guide along one side of said support, widely spaced bearings attached to said support laterally from said guide and separated from said guide by a space for members supported by and moving along said guide, an elongated rotary shaft journalled in said bearings and having a long spiral thread thereon between said bearings for engaging and moving said members along said guide when said shaft is rotated, and rigid abutment elements engaging the lateral sides of said shaft and also engaging the side of said shaft opposite from said guide and preventing vibration of said shaft in any direction away from said guide.

8. In a device of the character described, a rigid support, means forming a guide along one side of said support, an elongated shaft supported for rotation parallel with said guide and having a long spiral thread thereon for engaging and moving members along and between said guide and said shaft, rigid abutment elements engaging the lateral sides of said shaft and also engaging the side of said shaft opposite from said guide and preventing vibration of said shaft in any direction away from said guide, and mechanism for rotating said shaft.

9. A device of the character described comprising a rigid support, means forming a guide along one side of said support, an endless flexible element, threaded members attached to said element and adapted to be moved along said guide, a shaft supported for rotation parallel with and separated from said guide by a space through which said members are movable and having a spiral thread for engaging and moving said members along and between said guide and said shaft, and rigid abutment elements engaging the lateral sides of said shaft and also engaging the side of said shaft opposite from said guide and preventing vibration of said shaft away from and laterally with respect to said guide and holding said shaft securely engaged with said members.

RAY E. PONDER.